(12) United States Patent
Takenaka

(10) Patent No.: US 6,411,829 B1
(45) Date of Patent: Jun. 25, 2002

(54) RADIO COMMUNICATION EQUIPMENT AND METHOD FOR CONTROLLING CHARGE OF THE SAME

(75) Inventor: Hidetoshi Takenaka, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/512,519

(22) Filed: Feb. 24, 2000

(30) Foreign Application Priority Data

Feb. 24, 1999 (JP) .......................................... 11-045910

(51) Int. Cl.$^7$ ................................................ H04Q 7/32
(52) U.S. Cl. ....................... 455/573; 455/572; 455/550; 320/162; 320/114
(58) Field of Search .............................. 455/550, 573, 455/572, 575, 90, 566, 128, 351, 347, 346, 344, 462, 465; 320/162, 104, 108, 112, 113, 114, 115, 124, 149, 151, 156, 159; 307/46, 48

(56) References Cited

U.S. PATENT DOCUMENTS

| | | | |
|---|---|---|---|
| 5,115,182 A | * 5/1992 | Ehmke et al. | ............... 455/573 |
| 5,317,249 A | 5/1994 | Ford | ........................... 455/573 |
| 5,606,241 A | 2/1997 | Patino et al. | ................ 455/573 |
| 5,668,462 A | * 9/1997 | Hannsson et al. | ........... 455/573 |
| 5,677,944 A | * 10/1997 | Yamamoto et al. | .......... 455/573 |
| 5,754,027 A | 5/1998 | Oglesbee et al. | ............ 320/162 |
| 6,246,890 B1 | * 6/2001 | Sato et al. | ................... 455/573 |

FOREIGN PATENT DOCUMENTS

| | | |
|---|---|---|
| EP | 0406858 A2 | 1/1991 |
| GB | 2262401 A | 6/1993 |
| GB | 2262668 A | 6/1993 |
| GB | 2315933 A | 2/1998 |
| JP | 7-57785 | 3/1995 |
| JP | 7-87007 | 3/1995 |
| JP | 2563149 | 11/1997 |
| JP | 10-200615 | 7/1998 |
| WO | WO 98/12790 | 3/1998 |

* cited by examiner

Primary Examiner—William Trost
Assistant Examiner—Keith Ferguson
(74) Attorney, Agent, or Firm—Scully, Scott, Murphy & Presser

(57) ABSTRACT

Radio communication equipment is provided which is capable of reliably completing a charge of a battery at a proper charging capacity and without causing deterioration of the battery regardless of whether or not a backlight function is continuously used at the time of charging. When a portable telephone starts charging, a CPU judges whether the backlight is turned ON. If the backlight is turned ON, a signal indicating that it is in the ON state is outputted from the CPU to a charging completion detecting circuit. The charging completion detecting circuit sets a threshold value indicating a charging completion current value to a threshold value being higher than an ordinary threshold value. A current detecting circuit detects a value of a current flowing from a charging terminal to a charging current detecting resistor and the charging completion detecting circuit judges whether a current value detected by the current detecting circuit has reached the set threshold value. When the current value detected by the current detecting circuit reaches the set threshold value, the charging is complete.

10 Claims, 5 Drawing Sheets

RADIO COMMUNICATION EQUIPMENT AND METHOD FOR CONTROLLING CHARGE OF THE SAME

BACKGROUND OF THE INVENTION

1. Field of the Invention

The present invention relates to a radio communication equipment and a method for controlling a charge of the same, and more particularly to the radio communication equipment in which a charging circuit is embedded and the method for controlling a charge of the same.

2. Description of the Related Art

In recent years, a method for charging a battery of a portable telephone called a "floating charge method" is used in which the charging to the battery and/or power supply to loads of a radio section or a control section are performed by using a same circuit and same line. Because of this, a current flowing through a charging circuit is represented as a value of a current obtained by adding a value of a current applied to loads in the radio section or the control section to a charged current value.

In general, a current value indicating the completion of the charging of the portable telephone is set in accordance with a charging characteristic of a single battery or the charging characteristic appearing at the time of waiting for a call of the portable telephone. At this point, the current value indicating the completion of the charging is set by considering a consumed current as a load current value and the consumed current is at a level of several mA and is within specified limits that can be negligible.

On the other hand, though recent portable telephones have a backlight function used to light an LCD (Liquid Crystal Display) device and a key switch, the consumed current value at the time of using the backlight function, i.e., the load current value is very great compared with the current consumed while waiting for a call which is, for example, several tens of mA and therefore cannot be neglected when the current value indicating the completion of the charging is set. Usually, the backlight goes OFF within about 10 to 20 seconds. If the battery of portable telephones is charged with it connected to an in-car adapter, i.e., if the power is supplied through a cigarette lighter mounted in a motor vehicle, a user can select a mode in which the backlight is continuously lit. There are many cases where the backlight is continuously lit with the portable telephone connected to an in-car adapter. A night driver of a car selects the mode to continuously light the backlight to see a reading of a speedometer indicator or a tachometer. Moreover, such a selection is made, because, if the backlight goes OFF within about 10 to 20 seconds, the frequency of the lighting operation increases which may cause frequent traffic accidents or because the power supply from a cigarette lighter in a car eliminates the need for a concern for an increase in current consumption. However, if the user selects the continuous lighting mode at the time of charging and continues to light the backlight, the load current required for activating the backlight function increases, causing an increase of current flowing through the charging circuit. The charging is complete when a value of the current flowing through the charging circuit reaches the current value indicating the completion of the charging. However, if the load current required for activating the backlight function increases, a problem arises that there is a case where the charging is complete before the value of the current flowing through the charging circuit reaches the set current value indicating the completion of the charging.

The above problem is further described by referring to FIGS. 5A and 5B. FIG. 5A is a diagram showing a change of a charging voltage (i.e., charging characteristic) at the time of charging a conventional portable telephone and FIG. 5B is a diagram showing a change of a charging current (i.e., charging characteristic) at the time of charging the conventional portable telephone. In FIGS. 5A and 5B, the charging characteristic appearing when the backlight function is continuously used at the time of charging is shown by a full line and the charging characteristic appearing when the backlight function is not used at the time of charging is shown by a dotted line.

As shown in FIG. 5A, when the backlight function is not used at the time of charging (see the dotted line), the charging is started at time 0 and the charging is performed at a specified voltage VCHG, for example, at 4.1V at time T1 and, thereafter at a constant voltage. When the charging is complete at time T3, the charging voltage decreases. As shown in FIG. 5B, the charging is performed from time 0 to T1 at a constant current, for example, 500 mA and thereafter the charging is performed at the constant voltage, resulting in a decrease of the current. Then, when the charging current reaches a constant current ICUT1, for example, 50 mA, the charging is complete.

On the other hand, as shown in FIG. 5A, when the backlight function is used at the time of charging (see the solid line), the charging is started at time 0 and the charging voltage reaches a specified voltage VCHG at time T2 and thereafter the charging is performed at a constant voltage. Furthermore, as shown in FIG. 5B, the charging is performed from time 0 to T2 at a constant current ICHG and thereafter the charging is performed at the constant voltage, resulting in a decrease of the current.

However, in the portable telephone as described above, since the load current required for activating the backlight function flows continuously, the charging current, after having decreased, does not reach the current value ICUT1 indicating the completion of the charging. This causes a problem in that the charging is not normally complete. Another problem is that, because the charging is continued at the constant voltage VCHG, a battery is deteriorated.

To solve this problem, an idea is reported that the current value indicating the completion of the charging is set to a high value. However, in this case, though the charging is complete when the backlight function is continuously used, the charging is halfway complete when the charging is performed without the use of the backlight, causing charging capacity to be exhausted.

SUMMARY OF THE INVENTION

In view of the above, it is an object of the present invention to provide radio communication equipment which is capable of reliably completing a charge of a battery at a proper charging capacity and without causing deterioration of the battery regardless of whether or not a backlight function is continuously used at a time of charging.

According to a first embodiment of the present invention, there is provided radio communication equipment including:
 displaying means for displaying various information;
 operating means composed of keys;
 lighting means for lighting the displaying means or the operating means;
 current detecting means for detecting a charging current used for charging a battery;
 judging means for judging whether the lighting means is turned ON or not;
 setting means for a charging completion current value based on judged results obtained from the judging means; and charging completing means for completing the charge when the charging current reaches the charging completion current set by the setting means.

In the foregoing, a preferable mode is one that wherein includes:

charging completion detecting means for detecting that the charging current has reached a charging completion current value set by the setting means;

battery voltage detecting means for detecting voltages of the battery;

switching means for switching a mode to charging of the battery; and charging control means for controlling the switching means based on detected results obtained from the current detecting means, the charging completion detecting means and the battery voltage detecting means.

Also, a preferable mode is one wherein the setting means, when the lighting means is turned OFF, is used to set a first charging completion current value and, when the lighting means is turned ON, to set a second charging completion value which is larger than the first charging completion current value.

Also, a preferable mode is one wherein the second charging completion current value is a value obtained by adding load current values of the lighting means to the first charging completion current value.

Also, a preferable mode is one that wherein has outputting means for outputting a control signal to turn the lighting means ON/OFF based on operations of the operating means and wherein the judging means is used to judge whether the lighting means is turned ON or not based on the control signal.

According to a second aspect of the present invention, there is provided radio communication equipment including:

displaying means for displaying various information;

operating means composed of keys; and whereby a charging completion current value is set based on whether the displaying means or the operating means is lit or not and charging is made complete when a charging current value to charge a battery reaches the set charging completion current value.

In the foregoing, it is preferable that the radio communication equipment is a portable telephone or a like.

According to a third aspect of the present invention, there is provided a method for controlling a charge of radio communication equipment including:

a step of starting the charge;

a step of judging whether a lighting circuit is turned ON;

a step of setting a charging completion current value based on judged results obtained from the judging step;

a step of detecting a charging current; and a step of completing the charging when the charging current reaches the charging completion current value.

In the foregoing, a preferable mode is one wherein setting step includes a step of setting a first charging completion current value when the lighting circuit is turned OFF, and of setting a second charging completion current value that is larger than the first charging completion current value when the lighting circuit is turned ON and wherein the charging completion step includes a step of completing the charging when the charging current reaches the first and second charging completion current values based on the judged results.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
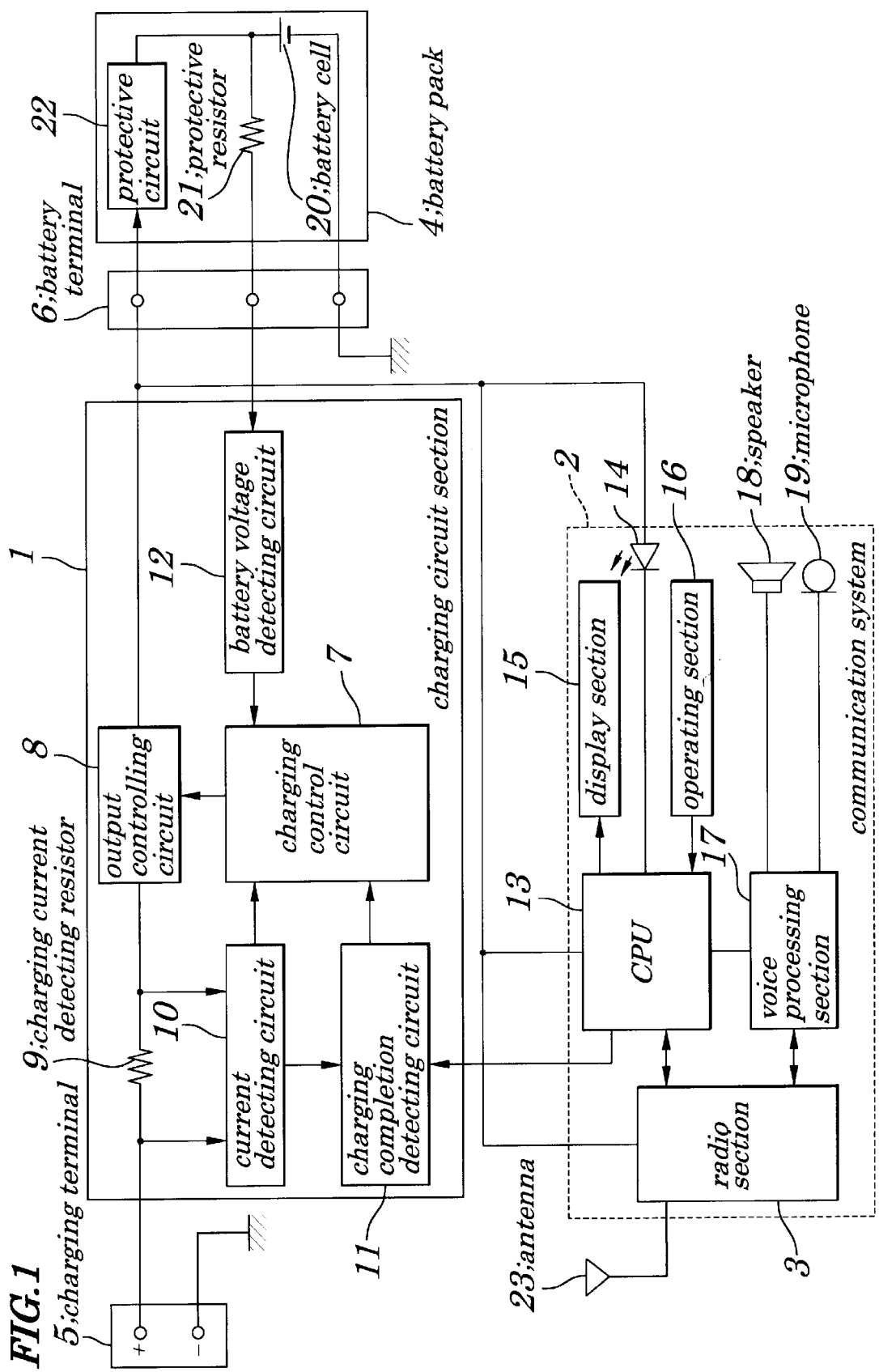
FIG. 1 is a schematic circuit diagram showing configurations of radio communication equipment, preferably a portable telephone according to a first embodiment of the present invention.

FIG. 1 is a schematic circuit diagram showing configurations of radio communication equipment, preferably of a portable telephone according to a first embodiment of the present invention. In FIG. 1, a communication system 2 is comprised of a radio section 3, a CPU 13, a lighting circuit 14, a display section 15, an operating section 16, a voice processing section 17, a speaker 18 and a microphone 19. The radio section 3 is used to receive a radio signal through an antenna 23 from a base station (not shown) and to send the radio signal through the antenna 23 to the base station (not shown). The display section 15 is adapted to display time information, a telephone number, a name of a signal receiver, information about if the signal receiver is located within a communication range and various functions. The display section 15 are various devices to be selected by a user at the time of setting of various functions, of registration of telephone numbers and names of signal receivers, of inputting of telephone numbers or a like at a time of an outgoing call or incoming call including ten key pads, function keys and outgoing call buttons or a like. The lighting circuit 14 is used to light the display section 15 or the operating section 16, for example, at the time of termination or when the user manipulates the operating section 16. The voice processing section 17 modulates voice signals fed from the radio section 3 and demodulates voice signals transmitted through the microphone 19. The speaker 18 is used to output a voice of a call receiver and a ringing sound. Receiving of a call is informed by means of a display of the display section 15, a vibration of a vibrator (not shown) or a flashing of an LED (Light Emitting Diode) or a like. The microphone 19 is used to input voices uttered by the user. The CPU 13 judges whether the lighting circuit is turned ON or not and outputs the judged result by binary signals composed of "0" and "1" at every specified time to a charging completion detecting circuit 11. The CPU 13 is also used to detect or control a state of each circuit to be connected and, at a time of completion of the charging, to control the display section 15 for displaying the completion of the charging. The completion of the charging may be informed by an output having a tone being different from a ringing sound outputted by the speaker, by the vibration of the vibrator (not shown) or by flashing of the LED (not shown). The speaker 18 mounted on the in-car adapter (not shown), the display section 15, the LED or a like may also be used to inform of the completion of the charging.

A charging circuit section 1 is composed of a charging control circuit 7, an output controlling cercuit 8, a charging current detecting resistor 9, a current detecting circuit 10, a charging completion detecting circuit 11 and a battery voltage detecting circuit 12. The current detecting circuit 10 connected across the charging current detecting resistor 9 is used to detect a value of a current flowing from a charging terminal 5 to the charging current detecting resistor 9. The charging completion detecting circuit 11 is connected to the current detecting circuit 10 and used to compare a current value detected by the current detecting circuit 10 with a specified threshold value for detecting the completion of the charging. Two threshold values ICUT1 and ICUT2 are set, in advance, as a specified value and the charging completion detecting circuit 11 is adapted to select either of these two threshold values based on a binary signal outputted from the CPU 13, i.e., on whether the lighting circuit 14 is turned ON or not. That is, the charging completion detection circuit 11 selects the threshold value ICUT2 for setting if the lighting circuit 14 is lit, while it selects the threshold value ICUT1 if the lighting circuit 14 is not lit. The threshold value ICUT2 is so set that it is larger than the threshold value ICUT1, i.e., the threshold value ICUT2 is preferably a value obtained by adding a load current value required for activating the lighting circuit, for example, 50 mA to the threshold value ICUT1, for example, 50 mA. The battery voltage detecting circuit 12 is used to detect a battery voltage of a battery pack 4. The charging control circuit 7 is adapted to control the output controlling circuit 8 based on results detected by each connected detecting circuit.

The battery pack 4 is connected to the charging circuit section 1 through a battery terminal 6 and comprised of a battery cell 20, a protective resistor 21 and a protective circuit 22.

Figure 2A:
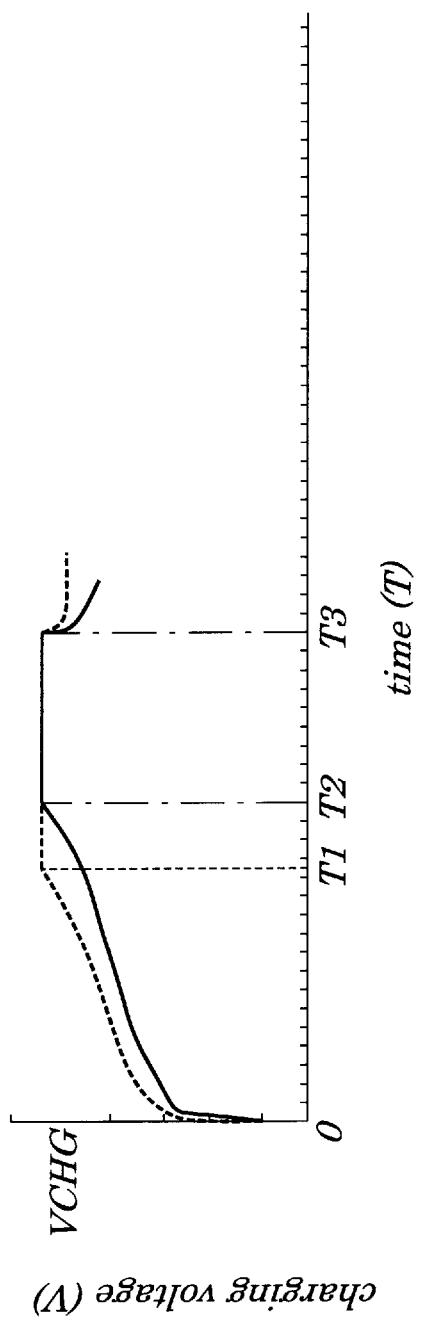
FIG. 2A is a diagram showing a change of a charging voltage (charging characteristic) at the time of charging a portable telephone according to the first preferred embodiment of the present invention and FIG. 2B is a diagram showing a change of a charging current (charging characteristic) at the time of charging a portable telephone according to the first preferred embodiment of the present invention.
Figure 2B:
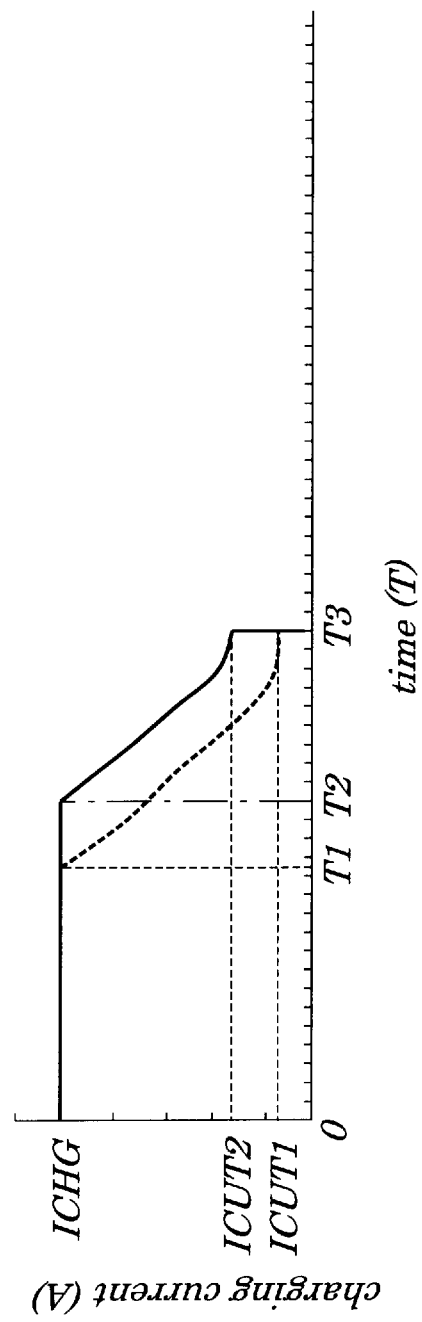

FIG. 2A is a diagram showing a change of a charging voltage (charging characteristic) at the time of charging a portable telephone according to the first preferred embodiment of the present invention and FIG. 2B is a diagram showing a change of a charging current (charging characteristic) at the time of charging a portable telephone according to the first preferred embodiment of the present invention. In FIGS. 2A and 2B, the charging characteristic appearing when the backlight function is continuously used at the time of charging is shown by a solid line and the charging characteristic appearing when the backlight function is not used at the time of charging is shown by a dotted line.

As shown in FIG. 2A, when the backlight function is not used at all at the time of charging (see the dotted line), the charging is started at time 0 and the charging is performed at a specified voltage VCHG, for example, at 4.1V at time T1, and thereafter at a constant voltage. At this point, the charging control circuit 7 is operative to control the output controlling circuit 8 based on a battery voltage of the battery pack 4 to be detected by the battery voltage detecting circuit 12 so that an output voltage becomes a specified voltage value VCHG. Thereafter, when the charging is complete at time T3, the charging voltage decreases. As shown in FIG. 2B, the charging is performed from time 0 to time T1 at a constant current ICHG, for example, 500 mA. At this point, the current detecting circuit 10 is adapted to detect a value of a current flowing from the charging terminal 5 to the charging current detecting resistor 9 and to output the detected current value to the charging control circuit 7, while the charging control circuit 7 is adapted to control the output controlling circuit 8 so that the outputted current becomes the specified current ICHG. Because the charging is performed at the constant voltage after time T1 and thereafter the charging current decreases and, when the charging current reaches the specified current value ICUT1, for example, 50 mA, the charging is complete.

On the other hand, if the backlight function is continuously used during the charging (see the solid line), as shown in FIG. 2A, after the charging starts at time 0, the charging voltage reaches a specified voltage VCHG at time T2 and the charging is then performed at the constant voltage. At this point, the charging control circuit 7 is adapted to control the output controlling circuit 8, based on a battery voltage of the battery pack 4 to be detected by the battery voltage detecting circuit 12, so that the outputted current becomes the specified voltage VCHG. Then, when the charging is complete at time T3, the charging voltage decreases. As shown in FIG. 2B, the charging is performed from time 0 to time T2 at a constant current ICHG. At this point, the current detecting circuit 10 is adapted to detect a value of a current flowing from the charging terminal 5 to the charging current detecting resistor 9 and to output the detected current value to the charging control circuit 7, while the charging control circuit 7 is adapted to control the output controlling circuit 8 so that the outputted current becomes the specified current ICHG. Because the charging is performed at the constant voltage after time T2 and, thereafter, the charging current decreases and, when the charging current reaches the specified current value ICUT2, for example, 100 mA, the charging is complete.

Figure 3:
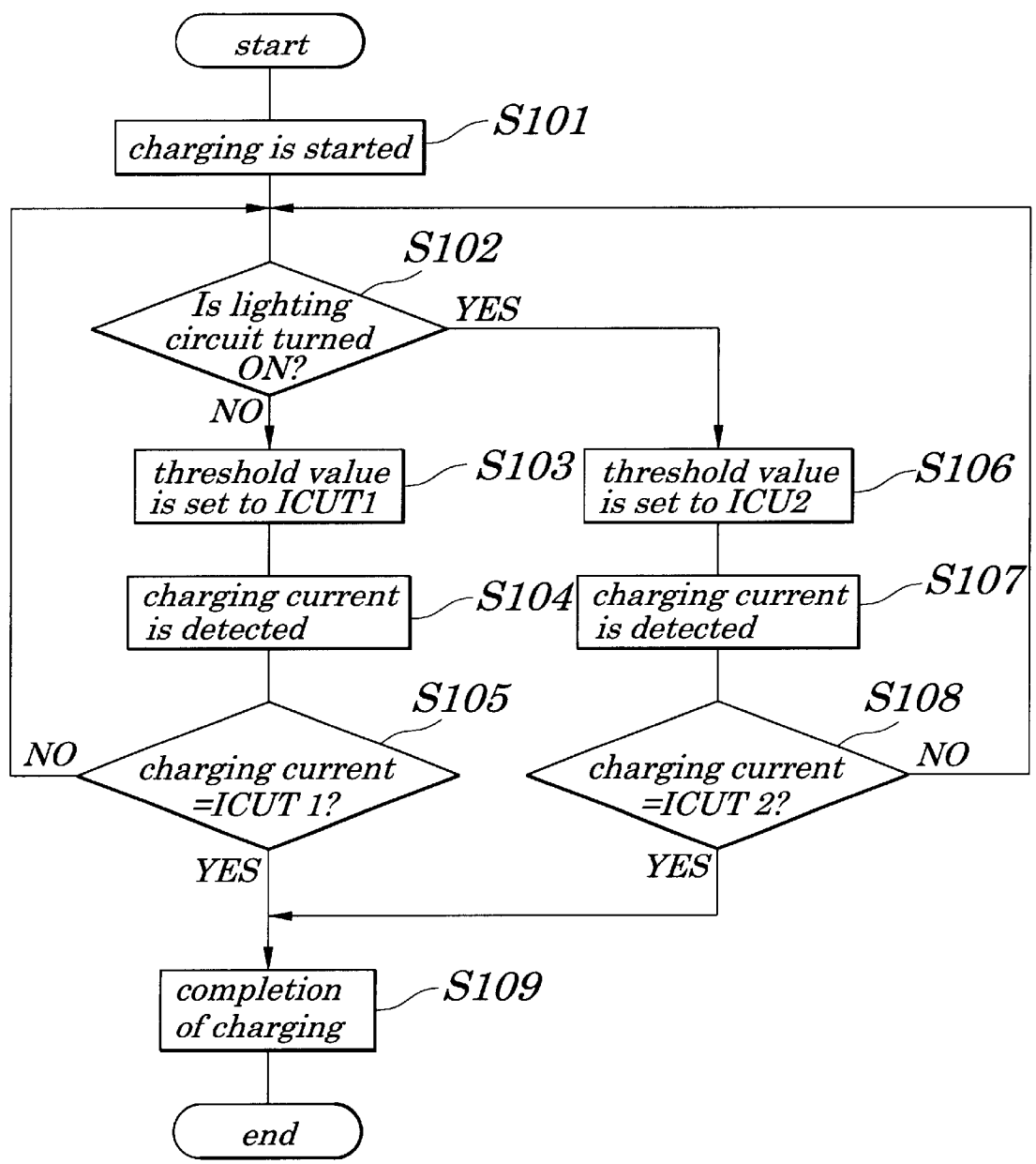
FIG. 3 is a chart flow showing operations of the portable telephone at the time of charging according to the first preferred embodiment of the present invention.

FIG. 3 is a chart flow showing operations of the portable telephone at the time of charging according to the preferred embodiment of the present invention.

In FIG. 3, when the charging is started with the portable telephone connected to, for example, the in-car adapter (Step 101), the CPU 13 is adapted to judge whether the backlight is turned ON (Step 102). Whether the backlight is turned ON or not is judged by presence or absence of operations of the operating section 16 made by the user or by termination state at the radio section 3. If the backlight is not turned ON (i.e., in the case of NO in Step 102), a signal indicating that it is not turned ON, for example, a binary signal "0" is outputted from the CPU 13 to the charging completion detecting circuit 11. At this point, it is preferable that the CPU 13 is so configured that it is provided with a first port to output a control signal for turning ON the lighting circuit 14 and a second port to output a signal indicating whether the backlight is turned ON, for example, a binary signal and that it outputs a binary signal immediately informing that the backlight is turned ON by having each of outputs from the first port and the second port linked together. The charging completion detecting circuit 11, when the binary signal "0" is inputted, is adapted to set the threshold value indicating the charging completion current value to the threshold value ICUT1 (Step 103). At the time of charging, the current detecting circuit 10 detects a value of a current flowing from the charging terminal 5 to the charging current detecting resistor 9 and outputs the detected current value to the charging completion detecting circuit 11 (Step 104). The charging completion detecting circuit 11 is adapted to judge whether the current value detected by the current detecting circuit 10 has reached the set threshold value ICUL (Step 105). If the current value detected by the current detecting circuit 10 has not yet reached the set threshold value ICUT1 (in the case of "NO" in Step 105), procedures of Step 102 and later are performed. If the current value detected by the current detecting circuit 10 has reached the set threshold value ICUT1 (in the case of "YES" in Step 105), it follows that the charging is complete and the completion of the charging is informed (Step 109).

On the other hand, at the time of starting the charge, if the backlight is turned ON (in the case of YES in Step 102), a signal that it is turned ON, for example, a binary signal "1" is outputted from the CPU13 to the charging completion detecting circuit 11. The charging completion circuit 11, when the binary signal "1" is inputted, is adapted to set the threshold value indicating the completion of the charging to the threshold value ICUT2 (Step 106). The current detecting circuit 10 has already detected a value of a current flowing from the charging terminal 5 to the charging current detecting resistor 9 (Step 107) and the charging completion detecting circuit 11 judges whether the current value detected by the current detecting circuit 10 has reached the set threshold value ICUT2 (Step 108). If the current value detected by the current detecting circuit 10 has not yet reached the set threshold value ICUT2 (in the case of "NO" in Step 108), procedures of Step 102 and later are performed. If the current value detected by the current detecting circuit 10 has reached the set threshold value ICUT2 (in the case of "YES" in Step 105), it follows that the charging is complete and the completion of the charging is informed (Step 109).

Second Embodiment

Figure 4:
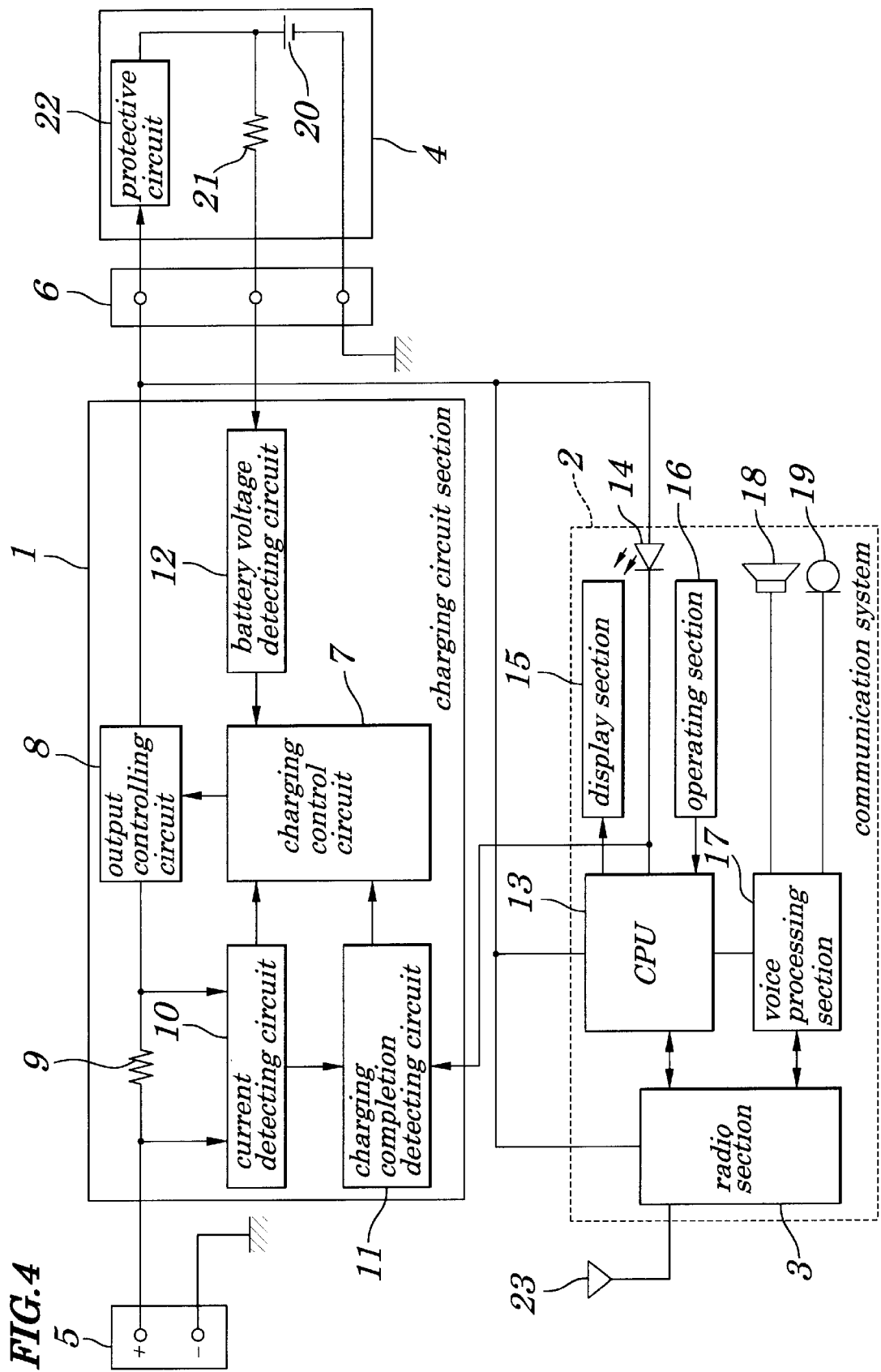
FIG. 4 is a schematic circuit diagram showing configurations of radio communication equipment, preferably a portable telephone according to a second embodiment of the present invention.
Figure 5A:
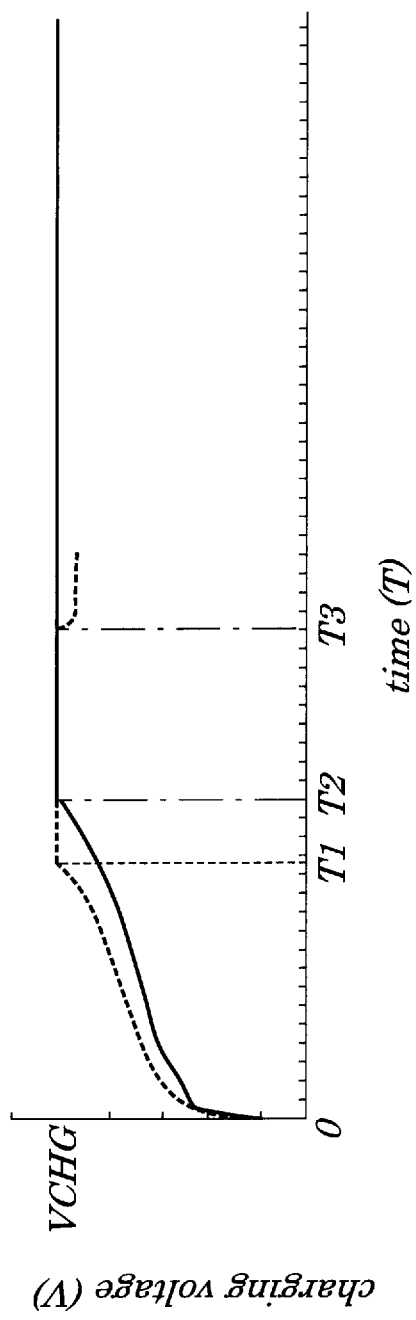
FIG. 5A is a diagram showing a change of a charging voltage (charging characteristic) at the time of charging a conventional portable telephone and FIG. 5B is a diagram showing a change of a charging current (charging characteristic) at the time of charging the conventional portable telephone.
Figure 5B:
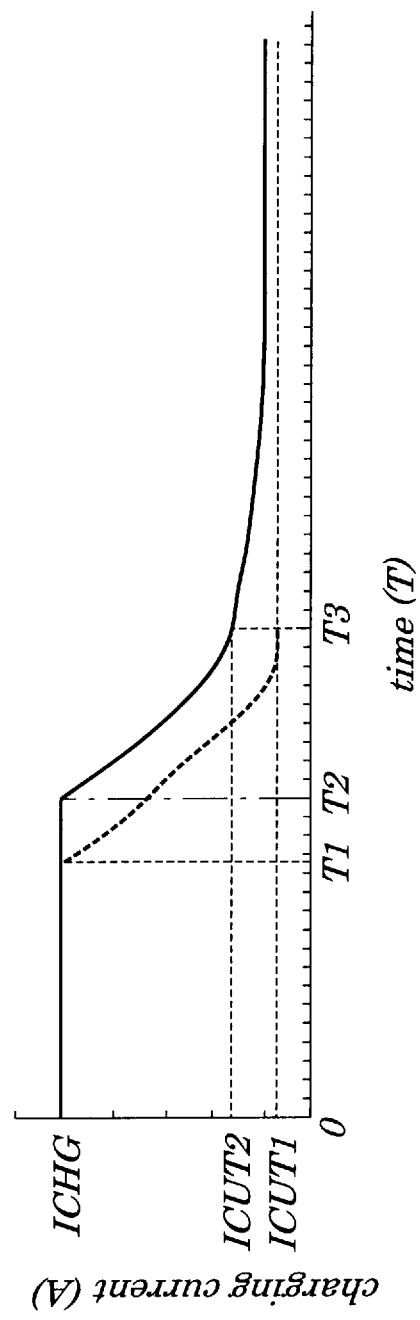

FIG. 4 is a schematic circuit diagram showing configurations of radio communication equipment, preferably a portable telephone according to a second embodiment of the present invention.

Same reference numbers in FIG. 4 designate corresponding parts in FIG. 1. In the portable telephone shown in FIG. 1, the CPU 13 is so configured as to judge whether the backlight is turned ON and its judging result is outputted to the charging completion detecting circuit 11. In contrast, in the portable telephone according to the second embodiment, the CPU 13 is adapted to output a judging result as to whether the backlight has been turned ON or not by using a port to control the backlight function. That is, the setting of a function to decide an operation state of a lighting circuit can be performed in cooperation with switching of a threshold value of the charging completion detecting circuit 11. Accordingly, this eliminates the need for monitoring of an operation state of the lighting circuit 14, for software processing to control the charging completion detecting circuit 11 and for an exclusive port used to control the charging completion detecting circuit 11.

Because charging characteristics and operations at the time of charging in the portable telephone operations are the same as those in FIG. 2B and in FIG. 3, descriptions of them are omitted to avoid verbosity.

As described above, according to the radio communication equipment of the present invention, by switching the current value indicating the completion of the charging based on the operation state of the lighting circuit used as the backlight function or of the lighting circuit used to directly light each circuit, it is possible to complete the charging of the battery at a proper charging capacity reliably and without causing deterioration of the battery.

It is apparent that the present invention is not limited to above embodiments but may be changed and modified without departing from the scope of the invention. For example, though, in these embodiments described above, the present invention is applied to a portable telephone, it is needless to say that it can be applied to general radio communication equipment including a radio selection calling receiver, a portable information terminal or the like so long as it is equipped with the charging circuit.

Moreover, in these embodiments, the first and second threshold values ICUT1 and ICUT2 are preliminarily set, however, they may be changed arbitrarily.

Furthermore, in these embodiments, the charging completion detecting circuit 11 is used to switch the threshold value which is the current value indicating the completion of the charging when the lighting circuit 14 is judged to be turned ON based on the presence or absence of operations by the users at the operating section 16 or on the detection of the termination state at the radio section 3 or when it is judged to be turned ON by the CPU 13's use of the first port adapted to control the lighting circuit 14, however, the CPU 13 may be configured so that it can automatically switch the threshold value in the charging completion detecting circuit 11 while the radio communication equipment is connected to the in-car adapter or when the user has selected the continuous lighting mode to continuously light the display section 15 or the operating section 16. This makes it unnecessary to switch the threshold value if the backlight goes out within several seconds, thus making it possible to prevent an increase in power consumption.

Also, though, in these embodiments, the method for charging control applied in the case where the lighting circuit 14 is used as the backlight function is disclosed, the present invention can be applied to a case where the lighting circuit 14 is used simply as a circuit to light each circuit including the display section 15, the operating section 16 or a like.

Additionally, though, in these embodiments, the method for charging control in the radio communication equipment embedding the charging circuit, the present invention can be applied to the radio communication equipment having no charging circuit.

Finally, the present application claims the Convention Priority based on Japanese Patent Application No. Hei11-045910 filed on Feb. 24, 1999, which is herein incorporated by reference.

What is claimed is:

1. Radio communication equipment comprising:

displaying means for displaying various information;

operating means composed of keys;

lighting means for lighting said displaying means or said operating means;

current detecting means for detecting a charging current used for charging a battery;

judging means for judging whether said lighting means is turned ON or not;

setting means for setting a charging completion current value based on judged results obtained from said judging means; and charging completing means for completing charging when said charging current reaches said charging completion current value set by said setting means.

2. The radio communication equipment according to claim 1, further comprising:

charging completion detecting means for detecting that said charging current has reached a charging completion current value set by said setting means;

battery voltage detecting means for detecting voltages of said battery;

switching means for switching a mode to charging of said battery; and charging control means for controlling said switching means based on detected results obtained from said current detecting means, said charging completion detecting means and said battery voltage detecting means.

3. The radio communication equipment according to claim 1, wherein said setting means, when said lighting means is turned OFF, is used to set a first charging completion current value and, when said lighting means is turned ON, to set a second charging completion value which is larger than said first charging completion current value.

4. The radio communication equipment according to claim 3, wherein said second charging completion current value is a value obtained by adding load current values of said lighting means to said first charging completion current value.

5. The radio communication equipment according to claim 1, further having outputting means for outputting a control signal to turn said lighting means ON/OFF based on operations of said operating means and wherein said judging means is used to judge whether said lighting means is turned ON or not based on said control signal.

6. The radio communication equipment according to claim 1, wherein said radio communication equipment is a portable telephone.

7. Radio communication equipment comprising:

displaying means for displaying various information;

operating means composed of keys; and whereby a charging completion current value is set based on whether said displaying means or said operating means is lit or not and charging is made complete when a charging current value to charge a battery reaches said set charging completion current value.

8. The radio communication equipment according to claim 7, wherein said radio communication equipment is a portable telephone.

9. A method for controlling a charge of radio communication equipment comprising:

a step of starting said charge;

a step of judging whether a lighting circuit is turned ON;

a step of setting a charging completion current value based on judged results obtained from said judging step;

a step of detecting a charging current; and a step of completing said charging when said charging current reaches said charging completion current value.

10. The method for controlling the charge of the radio communication equipment according to claim 9, wherein said setting step includes a step of setting a first charging completion current value when said lighting circuit is turned OFF, and of setting a second charging completion current value that is larger than said first charging completion current value when said lighting circuit is turned ON and wherein said charging completion step includes a step of completing said charging when said charging current reaches said first and second charging completion current values based on said judged results.

* * * * *